Patented Aug. 9, 1949

2,478,261

UNITED STATES PATENT OFFICE 2,478,261

POLYHYDRIC CYCLIC ALCOHOLS

Charles E. Frank, Wilmington, Del., assignor to E. I. du Pont de Nemours & Company, Wilmington, Del., a corporation of Delaware No Drawing. Application April 2, 1946, Serial No. 659,153

9 Claims. (Cl. 260—631)

This invention relates to polyhydric alcohols and more particularly to new polyhydric cyclohexanols and to novel methods for their preparation.

It is an object of this invention to provide a new class of polyhydric alcohols. A further object of this invention is to provide a new class of polyhydric cyclohexanols and novel methods for their preparation. Another object is to provide new polyhydric alcohols having improved properties and useful as intermediates in chemical synthesis and as glycerol substitutes in various applications. A still further object is to provide a novel catalytic process for preparing polyhydric cyclohexanols. Other objects will appear hereinafter.

These objects are accomplished by the invention of (hydroxymethyl) cyclohexanols and their preparation by the hydrogenation of (hydroxymethyl) phenols in the presence of a ruthenium catalyst. The process of this invention provides a novel, simple and direct method for the preparation of the new (hydroxymethyl) cyclohexanols from corresponding (hydroxymethyl) phenols.

The (hydroxymethyl) cyclohexanols of this invention include hydroxymethyl derivatives of cyclohexanols having, in addition to the hydroxymethyl substituents, alkyl, cycloalkyl, or alkoxyl radicals attached to the cyclohexanol nucleus. A particularly useful group of this new class of polyhydric cyclohexanols is that composed of mono-and di-(hydroxymethyl) derivatives of substituted and unsubstituted cyclohexanols. A preferred group is that composed of mono- and di(hydroxymethyl) alkylcyclohexanols wherein the hydroxymethyl and alkyl groups are the only substituents on the cyclohexanol nucleus.

In a preferred embodiment of this invention a mono- or di(hydroxymethyl) phenol is hydrogenated in the presence of 1 to 5% of its weight of a ruthenium catalyst and 100 to 200% of its weight of a solvent, such as ethanol, at temperatures of 100° to 150° C. under a hydrogen pressure of 1000 to 2500 lbs./sq. in. After absorption of hydrogen has ceased, the reaction mixture is cooled, the catalyst separated from it, and the resultant (hydroxymethyl) cyclohexanol isolated by conventional methods, such as for example, crystallization or fractional distillation.

The (hydroxymethyl) phenols used as the starting materials in the preparation of the (hydroxymethyl) cyclohexanols of this invention can be prepared from phenols and formaldehyde by customary methods; for example, by the process described by Hanus and Fuchs in J. Prakt. Chem. 153, 327 (1939).

This invention is further illustrated by the following example in which the proportions of the ingredients are expressed in parts by weight, unless otherwise specified.

Example I

A mixture of 75 parts of 2,6-di(hydroxymethyl)-4-methylphenol, 120 parts of absolute ethanol and 3 parts of ruthenium oxide is placed in a steel container capable of withstanding high pressure and shaken for about 2 hours at a temperature of 110–120° C. under a hydrogen pressure varying from 1000 to 2500 lbs./sq. in. After cooling to room temperature, the reaction mixture is removed from the container, filtered to separate the catalyst, and the straw-colored filtrate heated under reduced pressure on a steam bath to remove the ethanol. Addition of about 100 parts of benzene to the resulting viscous residue causes precipitation of a white crystalline solid which, after filtration and drying, amounts to 8 parts. This material, which is 2,6-di(hydroxymethyl)-4-methylcyclohexanol, has a melting point of 123–125° C., is soluble in water and in methanol, and insoluble in benzene and in ether. Analysis: Calc'd. for $C_9H_{18}O_3$: C, 62.05%; H, 10.35%. Found: C, 62.15%; H, 10.41%.

Distillation of the filtrate, first at atmospheric pressure to remove the benzene and then under reduced pressure, yields 30 parts of 2-hydroxymethyl-4,6-dimethylcyclohexanol, boiling at 135–155° C./3 mm. This material has a melting point of 115–117° C., and is soluble in methanol, slightly soluble in benzene, and insoluble in water and in petroleum ether. Analysis: Calc'd. for $C_9H_{18}O_2$: C, 68.35%; H, 11.39%. Found: C, 67.18%; H, 11.37%. There is obtained as an initial fraction in the distillation, 16 parts of 2,4,-6-trimethylcyclohexanol, having a boiling point of 186–188° C., and a final fraction consisting of 12 parts additional 2,6-di(hydroxymethyl)-4-methylcyclohexanol.

Although the invention has been illustrated by reference to two particular (hydroxymethyl) cyclohexanols prepared under certain conditions of reaction temperature and pressure, and with a certain type and concentration of ruthenium catalyst, it is to be understood that the process of this invention can be varied somewhat from the specific conditions described in the example. In general, the process is operated at temperatures ranging from 50° to 300° C. However, the reaction is preferably carried out at temperatures of 100° to 150° C. since under these conditions the desired reaction takes place at a rapid rate with the production of the (hydroxymethyl) cyclohexanol in satisfactory yield.

The process is carried out under pressures in excess of atmospheric. For best results hydrogen pressures in excess of 100 lbs./sq. in. and preferably in excess of 1000 lbs./sq. in. are used since under these conditions favorable reaction rates are obtained. The maximum pressure limit depends only on the structural limitations of the reaction vessel being used.

The catalyst used in the process of this invention comprises finely divided ruthenium, either in the form of the free metal or in the form of a compound which is reducible to metallic ruthenium under the conditions of the reaction. A commercial grade of ruthenium oxide is satisfactory as the catalyst in this process. Other forms of ruthenium which may be used in addition to ruthenium oxides, such as ruthenium sesquioxide, dioxide, and tetroxide, include the perruthenites, for example, barium perruthenite; ruthenates, for example, potassium, sodium, silver, barium, strontium, calcium, and magnesium ruthenates; perruthenates, for example, potassium and sodium perruthenates; ruthenium halides, such as ruthenium pentafluoride and ruthenium dichloride, trichloride and tetrachloride; ruthenium chloro salts, for example, potassium chloroperruthenate; ruthenium sulfides, such as ruthenium disulfide and trisulfide; ruthenium sulfates and the like. The ruthenium catalysts may be supported on a carrier such as charcoal, silica gel, alumina or other catalyst supports known in the art.

The amount of ruthenium catalyst used in this process may vary considerably. In general, the amount of catalyst used is that needed to bring about reaction at a suitable rate under the temperature and pressure conditions employed. Usually, an amount ranging from 0.1% to 10% of the weight of the (hydroxymethyl) phenol being hydrogenated is employed. The exact percentage employed depends on such factors as the operating temperature and the catalyst efficiency desired. In general, lower catalyst concentrations are effective at higher operating temperatures. Proportions of catalyst ranging from 1% to 5% are usually employed at reaction temperatures of 100 to 150° C.

The process of this invention may be carried out in the absence of a solvent if desired, but it is generally preferred to operate in the presence of an organic solvent such as an alcohol, ether or hydrocarbon. Specific examples of solvents which are operable include methanol, ethanol, propanol, isopropanol, dioxane, cyclohexane, and the like.

The products of this invention comprise the new class of cyclohexanols having one or more hydroxymethyl substituents. These (hydroxymethyl) cyclohexanols include hydroxymethyl derivatives of cyclohexanols having attached to the cyclohexanol nucleus, in addition to the hydroxymethyl groups, other substituent groups, such as alkyl, cycloalkyl or alkoxyl. Examples of such additional substituent groups include methyl, ethyl, propyl, isopropyl, butyl, cyclohexyl, methoxyl, ethoxyl, butoxyl, and the like. These alkyl-, cycloalkyl- and alkoxy(hydroxymethyl)- cyclohexanols are obtained from the corresponding alkyl cycloalkyl or alkoxyl substituted (hydroxymethyl) phenols by the process of this invention. Examples of specific (hydroxymethyl)- cyclohexanols contemplated by this invention include:

2,6-di(hydroxymethyl)-4-methylcyclohexanol
2-(hydroxymethyl)-4,6-dimethylcyclohexanol
2-(hydroxymethyl) cyclohexanol
2,6-di(hydroxymethyl) cyclohexanol
2-(hydroxymethyl)-4-ethylcyclohexanol
2,6-di(hydroxymethyl)-4 - methoxycyclohexanol, and
2,6-di(hydroxymethyl) - 4 - cyclohexylcyclohexanol.

(Hydroxymethyl) cyclohexanols having more than two hydroxymethyl groups, for example, tri(hydroxymethyl) cyclohexanols, are also included within the scope of this invention.

The new (hydroxymethyl) cyclohexanols of this invention are useful in various applications. They are of particular value as intermediates in chemical synthesis because of the presence of two or more hydroxyl groups in the same molecule. For example, (hydroxymethyl) cyclohexanols can be reacted with polybasic acids to form synthetic resins which are useful as ingredients in coating compositions. These new (hydroxymethyl) cyclohexanols are also useful as glycerol substitutes and as softeners or plasticizers for cellulose, cellulose derivatives, and various synthetic resins.

As many apparently widely different embodiments of this invention may be made without departing from the spirit and scope thereof, it is to be understood that I do not limit myself to the specific embodiments thereof except as defined in the appended claims.

I claim:

1. The method of preparing a (hydroxymethyl)- cyclohexanol wherein the hydroxyl and hydroxymethyl groups are on separate carbon atoms which comprises hydrogenating the corresponding (hydroxymethyl) phenol at a temperature of 50° to 300° C. in the presence of a ruthenium catalyst and hydrogen under a pressure in excess of 100 lbs./sq. in.

2. The method of preparing a (hydroxymethyl)-alkylcyclohexanol wherein the hydroxyl, hydroxymethyl and alkyl groups are on separate carbon atoms which comprises hydrogenating the corresponding (hydroxymethyl) alkylphenol at a temperature of 100° to 150° C. in the presence of a ruthenium catalyst and hydrogen under a pressure of 1000 to 2500 lbs./sq. in.

3. The method of preparing 2,6-di(hydroxymethyl)-4-methylcyclohexanol which comprises hydrogenating 2,6-di(hydroxymethyl)-4-methylphenol in ethanol at a temperature of 100° to 150° C. in the presence of a ruthenium catalyst and hydrogen under a pressure of 1000 to 2500 lbs./sq. in.

4. A (hydroxymethyl) cyclohexanol containing as sole substituents the hydroxyl and hydroxymethyl groups and a group selected from the class consisting of alkyl, cycloalkyl and alkoxy radicals, each of which groups is attached to a separate carbon atom of the nucleus.

5. A (hydroxymethyl) alkylcyclohexanol containing as sole substituents the hydroxyl, hydroxymethyl and alkyl groups, each of which groups is attached to a separate carbon atom of the nucleus.

6. A mono(hydroxymethyl) alkylcyclohexanol wherein the hydroxyl, hydroxymethyl and alkyl groups are the only substituents on the cyclohexane nucleus and are each attached to separate carbon atoms of the nucleus.

7. A di(hydroxymethyl)alkylcyclohexanol wherein the hydroxyl, hydroxymethyl and alkyl groups are the only substituents on the cyclohexane nucleus, and are each attached to separate carbon atoms of the nucleus.

8. The chemical compound 2,6-di(hydroxymethyl)-4-methylcyclohexanol.

9. The chemical compound 2-(hydroxymethyl)-4-,6-dimethylcyclohexanol.

CHARLES E. FRANK.

REFERENCES CITED

The following references are of record in the file of this patent:

UNITED STATES PATENTS

| Number | Name | Date |
| --- | --- | --- |
| 1,931,846 | Jaeger | Oct. 24, 1933 |
| 2,087,691 | Lazier | July 20, 1937 |
| 2,100,468 | Brubaker | Nov. 30, 1937 |

OTHER REFERENCES

Sen. Jour. Am. Chem. Soc., vol. 47, pp. 1086, 1089 (1925).

Taylor, Richter's Organic Chemistry, vol. II, p. 121 (1939).